United States Patent
Yun et al.

(10) Patent No.: US 6,822,998 B1
(45) Date of Patent: Nov. 23, 2004

(54) APPARATUS AND METHOD FOR MEASURING NOISE POWER IN A CDMA MOBILE COMMUNICATION SYSTEM

(75) Inventors: Yu-Suk Yun, Seoul (KR); Seung-Joo Maeng, Songnam-shi (KR); Soon-Young Yoon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 602 days.

(21) Appl. No.: 09/663,643

(22) Filed: Sep. 18, 2000

(30) Foreign Application Priority Data

Sep. 18, 1999 (KR) ............................................ 99-40250

(51) Int. Cl.⁷ ................................................ H04B 1/69
(52) U.S. Cl. ...................................... 375/130; 375/147
(58) Field of Search .............................. 375/142, 147, 375/145, 150, 342, 349, 136, 50; 370/335, 331, 320, 342, 441

(56) References Cited

U.S. PATENT DOCUMENTS

| | | | | |
|---|---|---|---|---|
| 5,982,763 A | * | 11/1999 | Sato | 370/342 |
| 6,028,894 A | * | 2/2000 | Oishi et al. | 375/227 |
| 6,034,952 A | * | 3/2000 | Dohi et al. | 370/335 |
| 6,118,806 A | * | 9/2000 | Niida et al. | 375/148 |
| 6,335,924 B1 | * | 1/2002 | Yano et al. | 370/335 |
| 6,347,220 B1 | * | 2/2002 | Tanaka et al. | 455/277.2 |
| 6,385,181 B1 | * | 5/2002 | Tsutsui et al. | 370/335 |
| 6,430,214 B1 | * | 8/2002 | Jalloul et al. | 375/147 |
| 6,483,816 B2 | * | 11/2002 | Tsunehara et al. | 370/318 |
| 6,532,252 B1 | * | 3/2003 | Moon et al. | 375/144 |

FOREIGN PATENT DOCUMENTS

JP 07-038469 2/1995

OTHER PUBLICATIONS

Japanese Office Action dated Feb. 3, 2004 issued in a counterpart application, namely, Appln. No. 2001–525872.

* cited by examiner

*Primary Examiner*—Emmanuel Bayard
(74) *Attorney, Agent, or Firm*—Dilworth & Barrese LLP

(57) ABSTRACT

A noise power measuring system and method for a base station receiver are disclosed. In the system and method, a received signal is despread and the noise power of the despread received signal is estimated. An orthogonal code generator generates a noise power measurement orthogonal code, which is orthogonal to all the orthogonal codes presently being used by the mobile station. A correlator connected to the orthogonal code generator performs a correlation operation between the noise power measurement orthogonal code and the despread received signal. A noise power measurer connected to the correlator, measures the noise power from the output of the correlator.

29 Claims, 6 Drawing Sheets

APPARATUS AND METHOD FOR MEASURING NOISE POWER IN A CDMA MOBILE COMMUNICATION SYSTEM

PRIORITY

This application claims priority to an application entitled "Apparatus and Method for Measuring Noise Power in CDMA Mobile Communication System" filed in the Korean Industrial Property Office on Sep. 18, 1999 and assigned Serial No. 99-40250, the contents of which are hereby incorporated by reference.

BACKGROUND OF THE INVENTION

1. Field of the Invention

The present invention relates generally to base station receiver for a CDMA mobile communication system, and in particular, to an apparatus and method for measuring noise power of a received signal.

2. Description of the Related Art

In general, a CDMA (Code Division Multiple Access) communication system performs forward and reverse power control. For reverse power control, a base station transmits a power control command to a mobile station so as to maintain a specific signal-to-noise ratio (SNR) for a specific reverse channel being received from a mobile station, thereby controlling transmission power of that mobile station. For this, the base station requires an apparatus for measuring an SNR of the reverse channel. In reverse power control mode, when a signal received from the mobile station has a low SNR, the base station commands the mobile station to increase its transmission power; otherwise, when the signal received from the mobile station has a high SNR, the base station commands the mobile station to decrease its transmission power. Here, "low SNR" implies a bad channel condition, and the "high SNR" implies a good channel condition.

As stated above, the CDMA mobile communication system controls transmission power of the mobile station through reverse power control to ensure stable and efficient data transmission for each user, thereby preventing a waste of transmission power at the mobile station.

Therefore, it is very important for the CDMA mobile communication system to accurately measure the SNR, because it is the basis on which power control is performed. That is, it is necessary to correctly measure the SNR in order to prevent a waste of mobile station transmission power and ensure effective power control.

FIG. 2 illustrates a structure of a power control apparatus included in a base station receiver for a CDMA communication system according to the prior art. Referring to FIG. 2, measurement of noise power for power control is conventionally performed on a signal received through an antenna ANT and a receiving filter 210. That is, a noise power measurer 218 measures the noise power of the received signal, which is not despread. Here, the received signal is a signal transmitted from a mobile station transmitter in a CDMA mobile communication system, the transmission signal including noise components generated by the radio channel environment. Therefore, the noise power measured by the noise power measurer 218 is not only the power of noise components but also the power of some signal components.

Further, the received signal filtered by the receiving filter 210 is provided to a sync acquisition block 212, which acquires synchronization from the filtered received signal. In order to reproduce a signal transmitted from the transmitter, the receiver must be synchronized with the transmitter, and the term "sync acquisition" means that the receiver is synchronized with the transmitter. After sync acquisition, a complex conjugate despreading sequence generator 214 generates a complex conjugate despreading sequence. The received signal provided from the receiving filter 210 is despread with the complex conjugate despreading sequence by a multiplier 216. The complex conjugate despreading sequence is a value determined by taking the conjugate of the complex spreading sequence that is used to spread the signal at the mobile station transmitter. A PN (Pseudo Noise) code is typically used for the complex spreading sequence and the complex conjugate despreading sequence. The received signal despread by the multiplier 216 is provided to a signal power measurer 220 for signal power measurement.

Next, the noise power measured by the noise power measurer 218 and the signal power measured by the signal power measurer 220 are provided to an SNR measurer 222. The SNR measurer 222 measures the ratio of the measured signal power to the measured noise power. The value provided from the SNR measurer 222 is compared with a power control threshold value by a comparator 226. The power control threshold value is generated by a threshold generator 224. A power control command generator 228 generates a power control command according to the comparison results of the comparator 226, and the generated power control command is transmitted to the mobile station transmitter for reverse power control.

A detailed structure of the noise power measurer 218 is shown in FIG. 3. Referring to FIG. 3, the conventional noise power measurer 218 estimates the power of the received signal as the noise power. As mentioned above, the received signal is a mixed signal of the signal transmitted from the mobile station transmitter and the noise components generated by the radio channel environment. Therefore, the noise power measured by the noise power measurer 218 is not the power of the noise components alone, but the power of the signal components mixed with the noise components. An averaging block 312, to estimate the noise power, averages the power of the received signal. Since power control is performed by calculating a ratio of the signal power measured by the signal power measurer 220 to the measured noise power, the SNR is determined by $$SNR = E_s/(E_c + N_o) \qquad (1)$$

where SNR denotes a signal-to-noise ratio, $E_s$ denotes signal power after despreading, $E_c$ denotes signal power before despreading, and $N_o$ denotes noise power.

Therefore, when the noise power is measured using the conventional noise power measurer, it is not possible to calculate a correct SNR, making it difficult to perform effective power control. For example, even when the actual signal power is high enough, the SNR approximation ($E_s/(E_c+N_o)$) is lower than the power control threshold value, thus making the base station generate an erroneous power-up command. The unnecessary increase in transmission power dissipates the battery power of the mobile station. Even though SNR is measured this way in the conventional IS-95 method for power control, the signal power-before-despreading $E_c$ is not so high in the conventional IS-95 communication system, so that it is possible to calculate a quite correct SNR. However, future CDMA-2000 mobile communication systems transmit an increased amount of data at a high data rate, thereby increasing the signal power in proportion to the amount of the transmission data. Therefore, if the noise power is measured using the conventional IS-95 method, the error will increase to an undesirable extent. That is, the conventional noise power measuring method measures the SNR by estimating the power of the total received signal (i.e., power of the signal components + power of the noise components) as the noise power. Thus, an increase in power of the signal components ($E_c$) will cause an increase in the difference between the estimated noise power ($E_c+N_o$) and the pure noise power ($N_o$), making it difficult to approximate the correct SNR.

SUMMARY OF THE INVENTION

It is, therefore an object of the present invention to provide an apparatus and method for measuring only the power of the noise components in a received signal in a base station receiver for a CDMA mobile communication system.

It is another object of the present invention to provide an apparatus and method for measuring noise power using an orthogonal code, which is not presently used in a mobile station, in a base station receiver for a CDMA communication system.

It is further another object of the present invention to provide an apparatus and method for measuring only the power of the noise components in a received signal, using an orthogonal code which is orthogonal to all the orthogonal codes used in a mobile station, in a base station receiver for a CDMA communication system.

According to one aspect of the present invention, a noise power measuring apparatus and method generates an orthogonal code, which is orthogonal to the orthogonal codes presently in use for mobile station channels, and performs a correlation operation between the generated orthogonal code and the despread received signal, thereby measuring only the noise power.

According to another aspect of the present invention, a noise power measuring apparatus and method generates an orthogonal code, which is orthogonal to all the orthogonal codes which can be used in the CDMA mobile communication system, and performs a correlation operation between the generated orthogonal code and the despread received signal, thereby measuring only the noise power.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Figure 1:
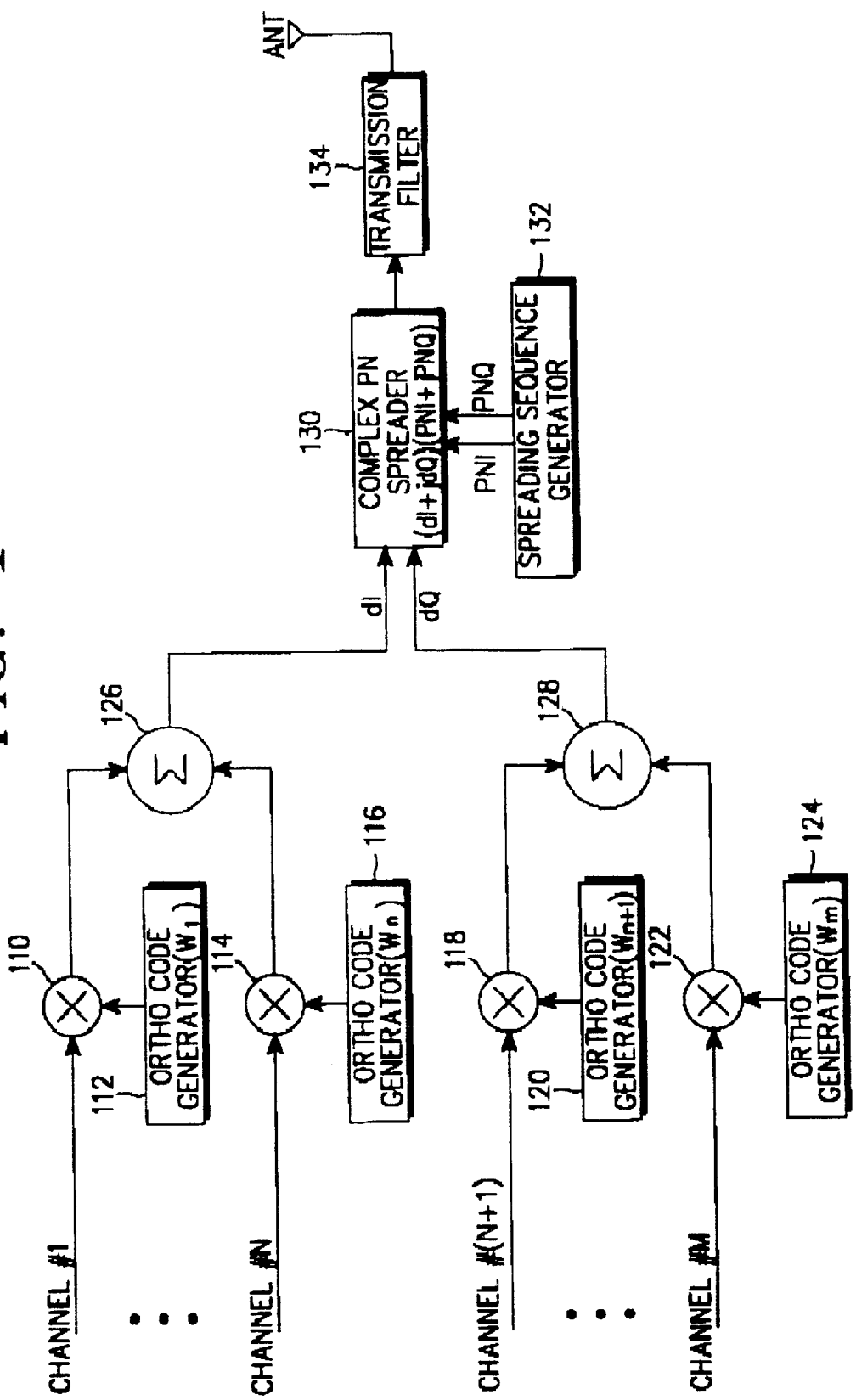
FIG. 1 is a block diagram illustrating a structure of a mobile station transmitter for a common CDMA mobile communication system.
Figure 2:
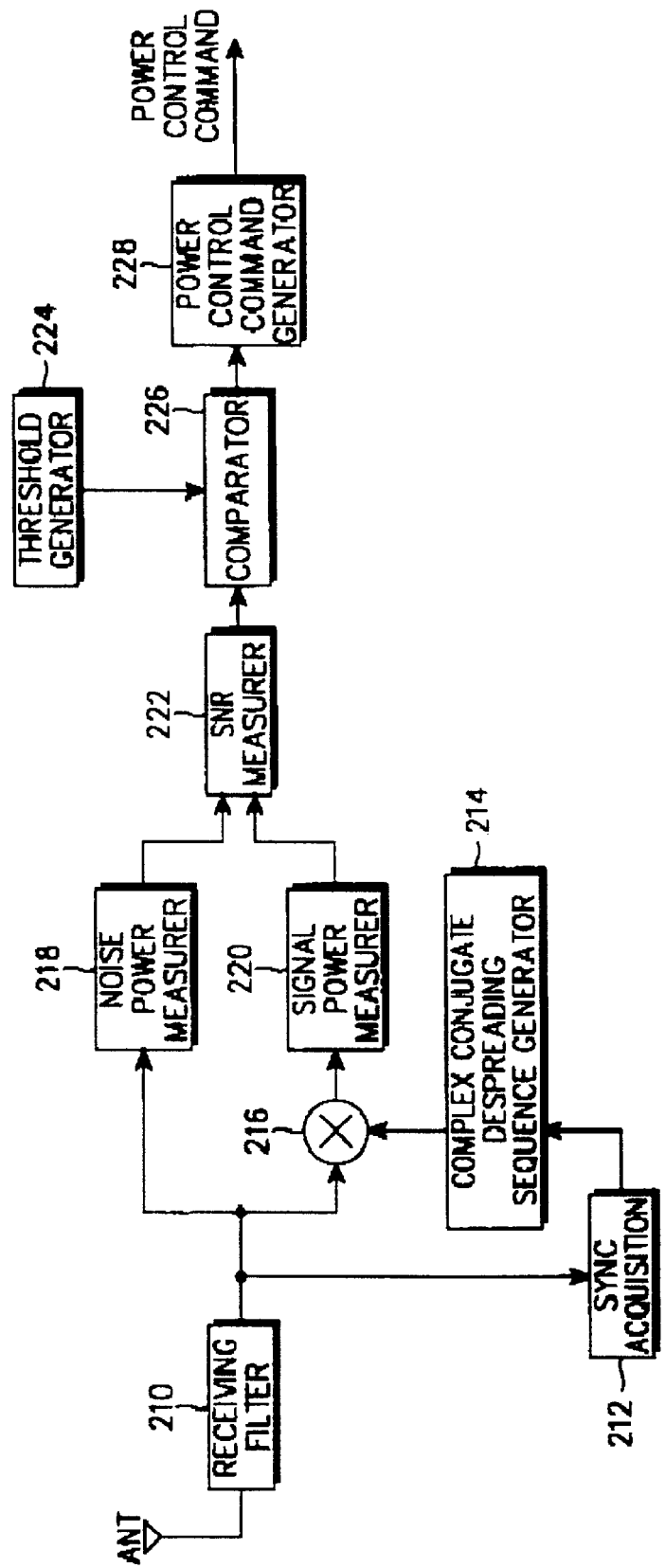
FIG. 2 is a block diagram illustrating a structure of a conventional power control apparatus included in a base station receiver for a CDMA mobile communication system.
Figure 3:
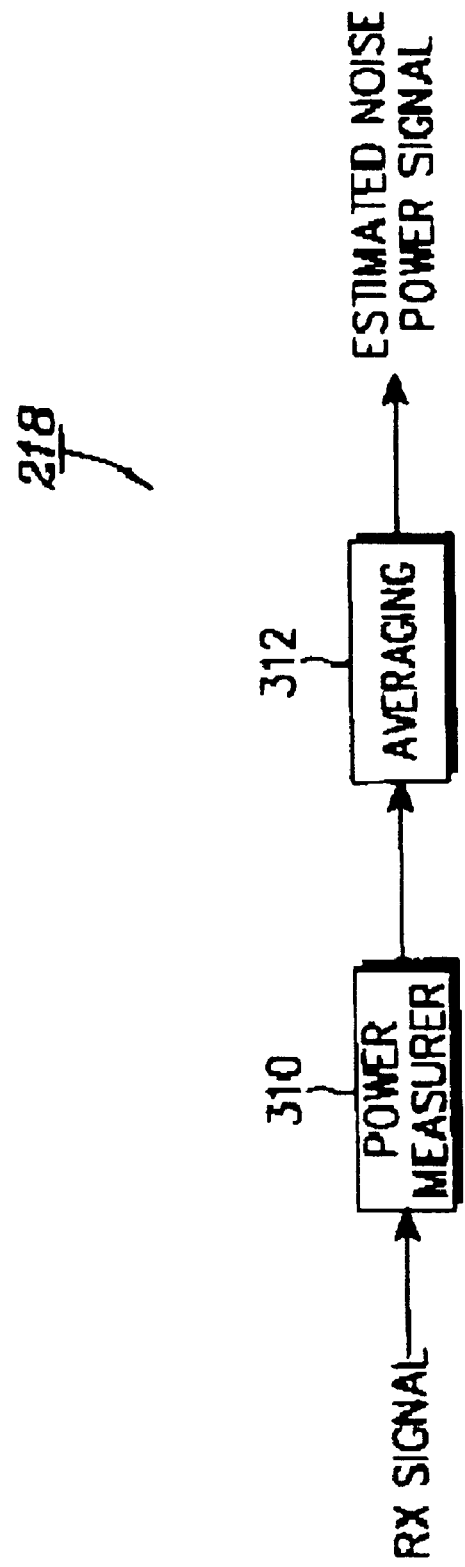
FIG. 3 is a block diagram illustrating a detailed structure of the noise power measurer shown in FIG. 2.

FIG. 1 is a general illustration of a structure of a mobile station transmitter in a CDMA mobile communication system. As illustrated in FIG. 1, the mobile station transmitter spreads transmission signals to be transmitted over specific channels with different orthogonal codes generated by orthogonal code generators 112–116 and 120–124, and adds the spread transmission signals using adders 126 and 128. The transmission signals output from the adders 126 and 128 are applied to a complex PN spreader 130, which spreads the transmission signals with complex spreading sequences $PN_I$ and $PN_Q$ provided from a spreading sequence generator 132. The spread transmission signals are transmitted to the base station through a transmission filter 130 and an antenna ANT. That is, the mobile station transmitter separates the transmission signals into channels by spreading with different orthogonal codes, thereby preventing interference among them.

Figure 4:
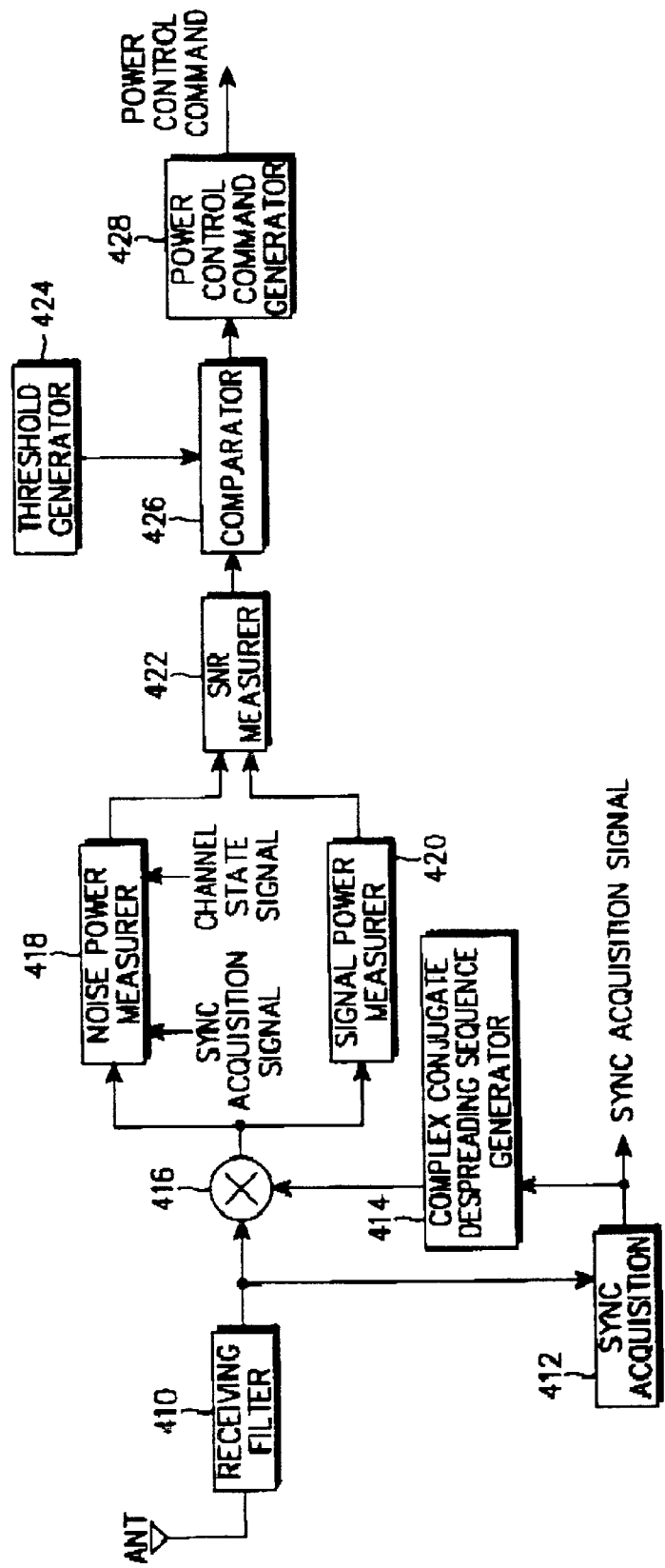
FIG. 4 is a block diagram illustrating a structure of a power control apparatus included in a base station receiver for a CDMA mobile communication system according to an embodiment of the present invention.

FIG. 4 illustrates a structure according to an embodiment of the present invention of a power control apparatus included in a base station receiver for the CDMA mobile communication system. Referring to FIG. 4, a receiving filter 410, which has a prescribed bandwidth, filters a received signal provided from an antenna ANT to that prescribed bandwidth. As mentioned above, the received signal can be defined as a mixed signal made up of the signal transmitted from the mobile station and the noise components added by the radio environment. The "transmitted signal" refers to a particular signal made up of a data signal and the orthogonal code by which the data signal was multiplied for separation at the mobile station. That is, the transmitted signal is a signal transmitted from the mobile station transmitter of FIG. 1. The noise components are the components added randomly by the radio channel environment, and, therefore, these components are not spread with an orthogonal code for channel separation. Thus, the noise components cannot be channel-separated by orthogonal property, and can be extracted by separating the transmitted signal from the received signal. A sync acquisition block 412 acquires synchronization with the mobile station transmitter using the filtered received signal, and generates a sync acquisition signal. The sync acquisition block 412 controls an offset so as to acquire synchronization with the complex spreading sequence used in the mobile station transmitter. A complex conjugate despreading sequence generator 414 generates a complex conjugate despreading sequence that is in sync with the received signal according to the sync acquisition signal from the sync acquisition block 412. The complex conjugate despreading sequence can be obtained by generating a complex spreading sequence being equal to the complex spreading sequence used in the mobile station transmitter and then taking the conjugate of the generated value.

A multiplier 416 despreads the received signal from the receiving filter 410 with the complex conjugate despreading sequence. A noise power measurer 418' according to an embodiment of the present invention measures only the noise power from the despread signal. Herein, "pure noise power" is defined as only the power of the noise components added to the received signal by the radio environment. A signal power measurer 420 measures only the signal power from the despread signal. An SNR measurer 422 calculates a ratio of the measured signal power to the measured pure noise power. A comparator 426 compares the calculated SNR with a power control threshold value. Herein, the "power control threshold value" is defined as a threshold value, which is based on which power control is performed. A threshold generator 424 generates the power control threshold value and provides the generated power control threshold value to the comparator 426. A power control command generator 428 generates a power control command according to the comparison results from the comparator 426. That is, the novel power control apparatus generates a power control command instructing the mobile station to decrease its transmission power, when the SNR is higher than or equal to the power control threshold value. Otherwise, when the SNR is lower than the power control threshold value, the power control apparatus generates a power control command instructing the mobile station to increase its transmission power.

Figure 5:
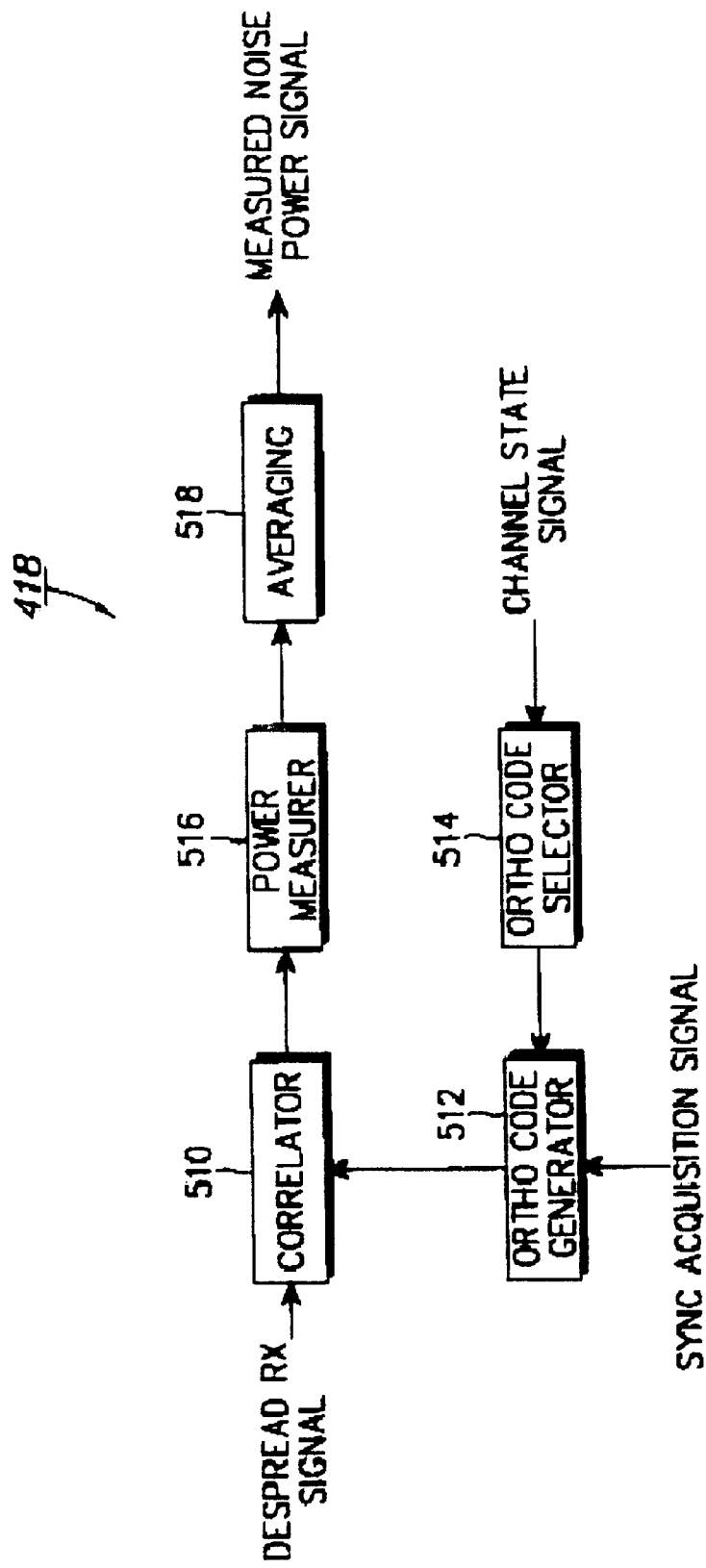
FIG. 5 is a block diagram illustrating a detailed structure of the noise power measurer shown in FIG. 4 according to a first embodiment of the present invention.

FIG. 5 illustrates a detailed structure of the noise power measurer 418 of FIG. 4 according to an embodiment of the present invention. Referring to FIG. 5, an orthogonal code selector 514 selects a noise power measurement orthogonal code according to a channel state signal provided from an upper layer. The term "upper layer" refers to an upper logical layer in the sense of a protocol stack, where the upper layer includes the logical concept for overall control of the base station receiver in a CDMA mobile communication system. The channel state signal is a signal indicating conditions of the channels presently in use, and includes information about the number, the identity, and the length of the orthogonal codes currently being used by the mobile station. The orthogonal code selector 514 selects an orthogonal code that is orthogonal to all the orthogonal codes presently being used for channels in the mobile station. An orthogonal code generator 512 generates the noise power measurement orthogonal code selected by the orthogonal code selector 514. The orthogonal code generator 512 synchronizes the generated noise power measurement orthogonal code with the received signal according to the sync acquisition signal provided from the sync acquisition block 412.

A correlator 510 performs a correlation operation between the despread signal from the multiplier 416 of FIG. 4 and the generated noise power measurement orthogonal code. The correlation operation refers to multiplying the despread received signal by the generated noise power measurement orthogonal code, and accumulating the multiplied value for the length of the noise power measurement orthogonal code. The signals output from the correlator 510 are the pure noise components included in the received signal. That is, since the generated noise power measurement orthogonal code from the orthogonal code generator 512 is orthogonal to all the orthogonal codes used for transmitting channels in the received signal, the channel signal components spread with all those orthogonal codes are removed from the signal correlated by the correlator 510. Thus, the correlated signal includes only the noise components, which were not spread with the orthogonal code.

A power measurer 516 measures power of the noise components from the correlator 510. An averaging block 518 accumulates the power measured by the power measurer 516 over a symbol unit, and calculates an average value of the accumulated power per symbol, in order to improve reliability. The signal output from the averaging block 518 is a measured noise power signal, and it is provided to the SNR measurer 422 of FIG. 4. The measured noise power signal is a value determined by estimating only the noise power.

Figure 6:
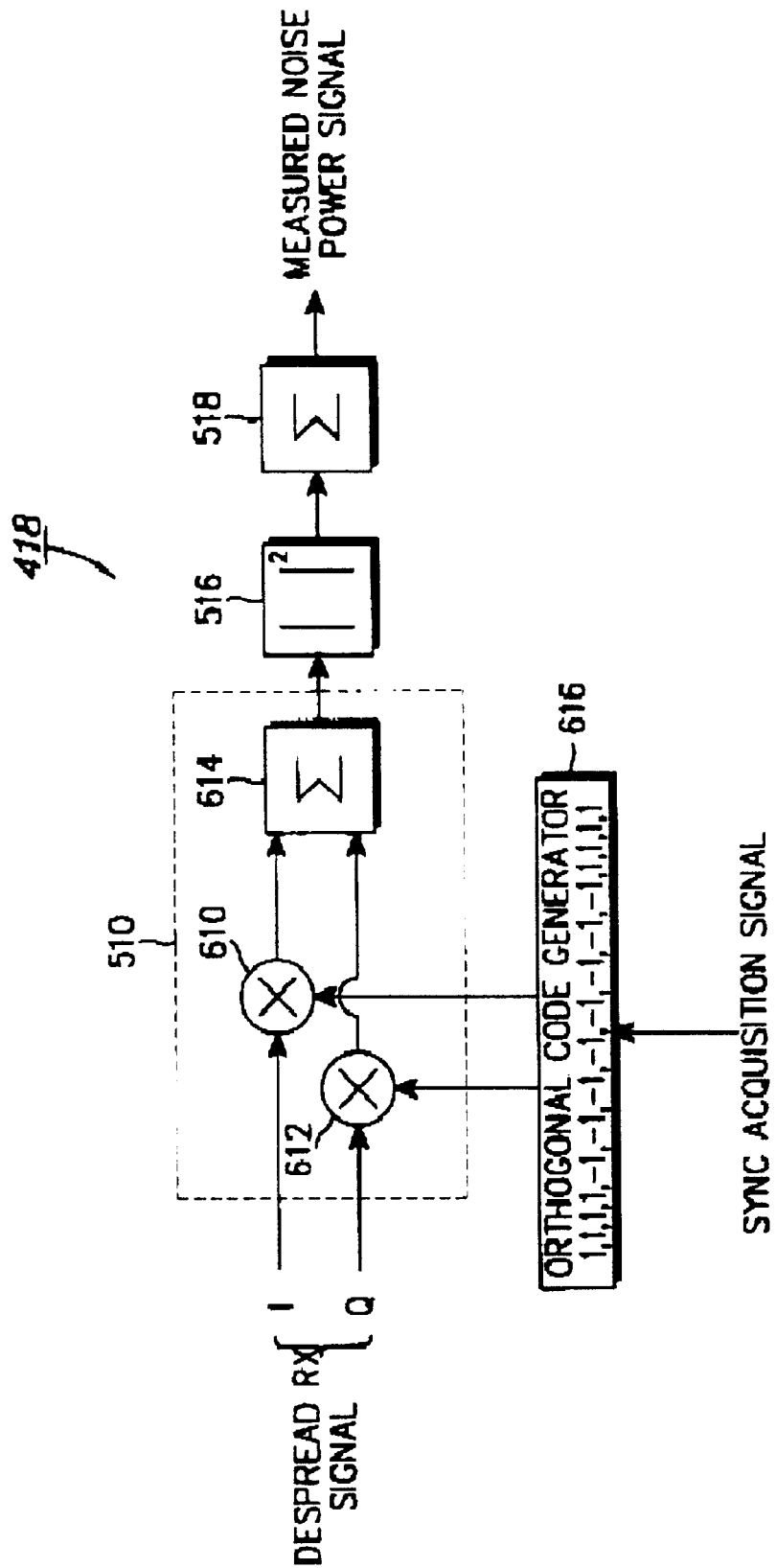
FIG. 6 is a block diagram illustrating a detailed structure of the noise power measurer shown in FIG. 4 according to a second embodiment of the present invention.

FIG. 6 illustrates a detailed structure of the noise power measurer 418 according to another embodiment of the present invention. Referring to FIG. 6, an orthogonal code generator 616 generates a prescribed noise power measurement orthogonal code which is synchronized with the received signal according to the sync acquisition signal provided from the sync acquisition block 412 of FIG. 4. The prescribed noise power measurement orthogonal code must necessarily be orthogonal to all the orthogonal codes used in the mobile station transmitter of the CDMA mobile communication system. The correlator 510 has the same structure in both FIG. 5 and FIG. 6, namely it is comprised of two multipliers 610 and 612 and an accumulator 614. The multiplier 610 multiplies a real part of the despread signal from the multiplier 416 of FIG. 4 by the noise power measurement orthogonal code from the orthogonal code generator 616. The multiplier 612 multiplies an imaginary part of the despread signal by the generated orthogonal code. The accumulator 614 accumulates the signals output from the multipliers for the time period corresponding to the length of the noise power measurement orthogonal code. The operation performed by the multipliers 610 and 612 and the accumulator 614 is equivalent to the correlation operation performed by the correlator 510 of FIG. 5. The power measurer 516 and the averaging block 518 have the same structures as described with reference to FIG. 5.

Now, operation of the embodiments will be described in detail with reference to the above-described structures. First, as described above, the invention has a first embodiment in which an noise power measurement orthogonal code is assigned to the channel in use, and a second embodiment in which a set noise power measurement orthogonal code is used. Below, these two embodiments are described separately.

Operation of the First Embodiment

Operation of the first embodiment will be described below with reference to FIGS. 4 and 5. In brief, the first embodiment receives information about the channels in use from the mobile station transmitter, generates an noise power measurement orthogonal code which is orthogonal to the orthogonal codes currently being used for channels, and performs correlation operation between the generated orthogonal code and the received despread signal provided, thereby isolating the noise components so that the noise power can be measured.

More specifically, the upper layer, which controls the overall operation of the base station receiver, manages information about channels presently being used. That is, the upper layer manages information about the number and the length of the orthogonal codes corresponding to the channels presently in use, and also keeps track of this information whenever the channel conditions are changed. Further, the upper layer provides the orthogonal code selector 514 with a channel state signal, which contains some of this information, in order that the selector 514 selects an orthogonal code which is orthogonal to all orthogonal codes currently in use. The orthogonal code selector 514 is provided with the channel state signal from the upper layer.

An example of a channel state signal provided from the upper layer is shown in Table 1 below.

TABLE 1

| Number of orthogonal codes presently being used | Index of first orthogonal code | Length of first orthogonal code | Index of second orthogonal code | Length of second orthogonal code | . . . | Length of nth orthogonal code |
|---|---|---|---|---|---|---|

Table 1 shows a case where the channel state signal is comprised of the number of orthogonal codes presently being used by the mobile station, and then a list of the index and length of each of the orthogonal codes being used. First comes the index and length of the first orthogonal code being currently used, then the index and length of the second, etc., up to the index and length of the nth (or last) orthogonal code being currently used. The index is a unique identifier of each orthogonal code. Although shown in Table 1 with a plurality of active orthogonal codes, it is possible that the channel state signal can be comprised of the number and the length of just one orthogonal code.

In Table 1, the Number field indicates the total number of orthogonal codes currently being used by the mobile station, therefore, it also indicates the number of indx/length pairs will follow in the channel state signal. As stated above, the Index field indicates the unique number of the orthogonal code in use; and the Length field indicates the length of the orthogonal code in use. The number of the Index fields and the Length fields is determined depending on the information recorded in the Num field. That is, as stated above, the number of the indexes and lengths of the next orthogonal codes is determined according to the value recorded in the Num field. When implementing the channel state signal, the number of bits in the respective fields shown in Table 1 can be varied.

Upon receipt of such a channel state signal, the orthogonal code selector 514 selects an noise power measurement orthogonal code based on the information contained in the received channel state signal. The orthogonal code selector 514 has a memory table in order to select the noise power measurement orthogonal code. An example of a memory table corresponding to a channel state signal with only one orthogonal code in use is shown in Table 2 below.

TABLE 2

| Index of the Orthogonal Code | Length of the Orthogonal Code | Orthogonal Code for Noise Power Measurement |
|---|---|---|
| 1 | 2 | ++−− |
| 2 | 4 | +− |
| 2 | 8 | +− |
| 4 | 16 | +− |
| 6 | 8 | +− |
| 8 | 16 | +− |
| 12 | 16 | +− |

As shown in Table 2, the memory table is constructed such that the noise power measure orthogonal code used for noise power measurement is selected according to the number and length of the single orthogonal code currently being used. Accordingly, the orthogonal code selector 514 uses this table to select the noise power measurement orthogonal code. If the index of the presently used orthogonal code is '2' and the length is '2', as indicated in the channel state signal, '+−' can be selected as the noise power measurement orthogonal code in accordance with Table 2.

However, when a plurality of orthogonal codes are being used, and therefore, a plurality of numbers and lengths of the orthogonal codes are provided in the channel state signal, it is not possible to select the noise power measurement orthogonal code through a memory table such as Table 2. When there is a channel state signal having a plurality of numbers and lengths of orthogonal codes, the orthogonal code selector 514 should separately include a more complex memory table for the various possible combinations. An example of such a memory table, where there are only two orthogonal codes in the channel state signal, is shown in Table 3 below.

TABLE 3

| Index of Orthogonal Code No. #1 | Length of Orthogonal Code Length #1 | Index of Orthogonal Code No. #2 | Length of Orthogonal Code #2 | Orthogonal Code for Noise Power Measurement |
|---|---|---|---|---|
| 1 | 2 | 2 | 8 | ++++−−−−−−−−++++ |
| 2 | 4 | 2 | 8 | ++++−−−−−−−−++++ |
| 2 | 4 | 6 | 8 | +− |

The orthogonal code selector 514 can store the memory tables of Table 2 and Table 3 therein. That is, it is possible to store the memory tables of Table 2 and Table 3 in the orthogonal code selector 514 and select in real time the noise power measurement orthogonal code according to the provided channel state signal.

Meanwhile, in the foregoing description, the orthogonal code selector 514 is so implemented as to assign one noise power measurement orthogonal code according to the channel state signal. As an alternative example, however, it is also possible to implement the orthogonal code selector 514 to have at least two noise power measurement orthogonal codes according to the channel state signal and then one of the orthogonal codes would have to be selected in real time. For example, if there is a channel state signal comprised of one orthogonal code being used, with index '2' and length '4', one of two orthogonal codes, such as '+−' and '++++−−−−−−−−++++', could be used as the noise power measurement orthogonal code. This is because the channel state signal comprised of the index '2' and the length '4' of an orthogonal code means that the orthogonal code presently used for a channel is '++−−'. The number and length information of the orthogonal code is specifically defined in the IS-2000 standard for future CDMA mobile communication systems. In other words, both orthogonal codes '+−' and '+++++−−−−−−−−++++' are orthogonal to orthogonal code '++−−'. The tables of Table 2 and Table 3 include the shorter orthogonal codes satisfying this rule.

In this section, the invention has been described with reference to a first embodiment which is implemented using the orthogonal code selector 514. On the other hand, however, the function of the orthogonal code selector 514 can also be performed in the upper layer. In that case, the upper layer selects a noise power measurement orthogonal code according to the number and index/length of the orthogonal codes presently in use. Therefore, the upper layer would have access to the equivalent of Tables 2 and 3, and would select the noise power measurement orthogonal code based on the received channel state signal. Once selected, the identifying information concerning the selected noise power measurement orthogonal code would be provided directly to the orthogonal code generator 512.

The noise power measurement orthogonal code determined by the orthogonal code selector 514 is provided to the orthogonal code generator 512. Upon receipt of the noise power measurement orthogonal code, the orthogonal code generator 512 generates a corresponding orthogonal code. At this point, the generated noise power measurement orthogonal code is synchronized with the received signal according to the sync acquisition signal provided from the sync acquisition block 412.

Next, the generated noise power measurement orthogonal code is multiplied by the despread received signal by the correlator 510. The multiplied value is accumulated by the correlator 510 for the time period corresponding to the length of the noise power measurement orthogonal code. As mentioned above, the despread received signal is comprised of the noise component and the transmission signal, which is identified by the unique orthogonal codes of the respective channels. Here, it should be noted that one property of orthogonal codes is that the value determined by multiplying the two codes which are orthogonal to each other and then accumulating the multiplied value is '0'. That is, if the received signal, containing an orthogonal code, is multiplied by an orthogonal code, which is orthogonal to the contained code, the contained code and its signal is canceled by the orthogonal code. When this property is applied in the embodiments of the present invention, it is possible to remove the transmission channel signals, which are each multiplied by the different orthogonal codes being used by the mobile station, by multiplying the received signal by a orthogonal code which is orthogonal to all of the used orthogonal code. In other words, it is possible to obtain only the noise components from a received signal, by multiplying the received signal including the transmission signal and the noise components by a prescribed orthogonal code. Here, the prescribed orthogonal code must be orthogonal with the orthogonal codes used for the transmission signal.

In the above description, signal canceling performed by multiplying the signals having an orthogonal property with respect to each other is a basic function of the orthogonal code in the CDMA mobile communication system. That is, when the transmission signals are received from several users, the CDMA mobile communication system uses the orthogonal codes for user identification and channel separation.

In other words, the despread received signal is multiplied by the noise power measurement orthogonal code which is orthogonal to the orthogonal codes being used in the transmitted signal. Therefore, the signals having the orthogonal property, i.e., the transmission signals, are all removed from the despread received signal, and only the noise components are output. That is, it is possible to extract a unique (or original) signal by multiplying the orthogonal code by a signal having an orthogonal property. The output noise components are accumulated for the time period corresponding to the length of the orthogonal code for noise power measurement, thus outputting a correlation value through a correlation operation.

The correlation value, which is output from the correlator 510 after accumulating for the time period corresponding to the length of the noise power measurement orthogonal code, is provided to the power measurer 516, which measures the power of the provided correlation value. The measured power is noise power $N_o$ measured by the correlator 510 on only the noise components from which the pure signal components, i.e., the transmission signals are removed. Further, in order to increase the reliability of the noise power measurement determined in the above process, the measured noise power is provided to the averaging block 518, which calculates an average value of the measured noise power. The calculated average noise power is used as noise power for measuring the SNR.

Further, signal power $E_s$ required for measuring the SNR is estimated by multiplying the despread signal by the orthogonal code assigned to the channel and then accumulating the multiplied value in the signal power measurer 420.

After measuring the signal power $E_s$ and the noise power $N_o$, the SNR measurer 422 measures the SNR depending on the measured signal power $E_s$ and noise power $N_o$. The SNR measurer 422 measures the SNR in accordance with Equation (2) below.

$$SNR=E_s/N_o \qquad (2)$$

The SNR determined by Equation (2) is a ratio of the received signal power to noise power, and becomes fundamental data in performing power control. Meanwhile, it can be appreciated from Equation (2) that the SNR measured according to the present invention is calculated based on the pure noise power No. As described above, it is possible to obtain the SNR based on the pure noise power, because the pure noise power components can be obtained by multiplying the despread received signal by an noise power measurement orthogonal code having an orthogonal property with respect to the orthogonal codes used in the received signal.

Meanwhile, the comparator 426 and the power control command generator 428 generate a power control command according to the SNR. That is, when the SNR is higher than a prescribed power control threshold value, the power control command generator 428 generates a power-down command. On the other hand, when the SNR is lower than the power control threshold value, it means that the received signal includes a great deal of noise. Thus, the power control command generator 428 generates a power-up command. Here, the power control threshold value is generated by the threshold generator 424. The power control threshold value refers to a prescribed threshold value, based on which power control is performed.

Operation of the Second Embodiment

Operation of the second embodiment will be described with reference to FIGS. 4 and 6. In brief, the second embodiment uses a noise power measurement orthogonal code which is orthogonal property to all the orthogonal codes, which can be used in the CDMA mobile communication system. Thus, only one noise power measurement orthogonal code is generated using the orthogonal code generator 616, and it obtains the pure noise components by removing the pure signal components included in the despread received signal, and an accurate noise power measurement is made, by which the power control command generator performs power control based on the pure noise components.

More specifically, the orthogonal code generator 616 generates a fixed prescribed noise power measurement orthogonal code in sync with the sync acquisition signal provided from the sync acquisition block 412. The prescribed noise power measurement orthogonal code is orthogonal to all the orthogonal codes which can be used in the CDMA mobile communication system. For example, as illustrated in FIG. 6, the orthogonal code generator 616 may generate a noise power measurement orthogonal code of '++++--------++++', which, in fact, is orthogonal to all the orthogonal codes used in the IMT-2000 system. The fixed noise power measurement orthogonal code, which is generated by the orthogonal code generator 616, can be used to estimate only the pure noise components, even though both the signal and the noise are received through a specific channel. That is, although any signal despread with a complex conjugate despreading sequence is received, it is possible to estimate only the noise components by multiplying the received signal by the fixed noise power measurement orthogonal code.

Such an operation is performed by the correlator 510.

The correlator 510 is comprised of the multipliers 610 and 612 and the accumulator 614. An I channel corresponding to the real part of the despread signal is provided to the multiplier 610 and then multiplied by the generated orthogonal code. Hence, the I-channel despread channel signals are removed by the noise power measurement orthogonal code, which is orthogonal to the I-channel despread channel signals, so that the multiplier 610 outputs only the pure noise components. Herein, the output signal of multiplier 610 will be referred to as a first signal. A Q channel corresponding to the imaginary part of the despread signal is provided to the multiplier 612 and then multiplied by the generated orthogonal code. Hence, the Q-channel despread signal is removed by the noise power measurement orthogonal code, which is orthogonal to the Q-channel despread channel signals, so that the multiplier 612 outputs only the pure noise components. Herein, the output signal of the multiplier 612 will be referred to as a second signal. The first and second signals, which are the noise components output from the multipliers 610 and 612, are provided to accumulator 614 where the first and second signals are accumulated for the time period according to the length of the orthogonal code. The accumulated value is processed by the power measurer 516 and the averaging block 518 and is output as a noise power estimation signal. Since the power measurer 516 and the averaging block 518 have the same operation as described with reference to the first embodiment, a detailed description will be avoided.

By measuring the pure noise power in this manner, it is possible to accurately measure the SNR. Therefore, it is possible to prevent generation of an erroneous power control commands, thus preventing power dissipation due to the erroneous power control commands. That is, it is possible to perform power control more efficiently.

As described above, the present invention proposes an apparatus and method for measuring the pure noise power to accurately measure the SNR. Therefore, it is possible to efficiently perform reverse power control and prevent power dissipation.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A base station receiver in a CDMA (Code Division Multiple Access) mobile communication system, for measuring a signal-to-noise ratio (SNR) of a signal received at the base station over at least one of a plurality of channels in a mobile station transmitter, each of the plurality of the channels having a corresponding orthogonal code, said receiver comprising:
   a despreader for despreading the received signal with a complex despreading sequence;
   a noise power measurer for measuring noise power from the despread received signal provided from the despreader by removing signal power by using a noise power measurement orthogonal code which is orthogonal with at least one of the orthogonal codes of the plurality of the channels;
   a signal power measurer for measuring signal power from the despread received signal provided from the despreader; and
   an SNR measurer for measuring an SNR by receiving the noise power from the noise power measurer and the signal power from the signal power measurer.

2. The base station receiver as claimed in claim 1, wherein the noise power measurer comprises:
   an orthogonal code generator for generating the noise power measurement orthogonal code;
   a correlator connected to the orthogonal code generator, for performing correlation operation between the noise power measurement orthogonal code and the despread received signal from the despreader; and
   a power measurer connected to the correlator, for measuring the noise power from an output of the correlator.

3. The base station receiver as claimed in claim 1, wherein the noise power measurement orthogonal code is '1,1,1,1,-1,-1,-1,-1,-1,-1,-1,-1,1,1,1,1'.

4. The base station receiver as claimed in claim 1, wherein the noise power measurement orthogonal code is '1, 1,-1,-1'.

5. The base station receiver as claimed in claim 1, wherein the noise power measurement orthogonal code is '1,-1'.

6. The base station receiver as claimed in claim 1, wherein the noise power measurer removes the signal power from the despread received signal by multiplying the despread signal with the noise power measurement orthogonal code.

7. The base station receiver as claimed in claim 2, wherein the noise power measurer further comprises:
   an orthogonal code selector for receiving a channel state signal indicating at least one of the corresponding orthogonal codes used for at least one of the plurality of the channels and selecting an appropriate orthogonal code to be the noise power measurement orthogonal code according to the channel state signal.

8. The base station receiver as claimed in claim 7, wherein the orthogonal code generator generates the selected orthogonal code as the noise power measurement orthogonal code.

9. The base station receiver as claimed in claim 1, further comprising a synchronization (sync) acquisition device for acquiring synchronization from the received signal and generating a sync acquisition signal for synchronizing the despreader and the orthogonal code generator with the received signal.

10. The base station receiver as claimed in claim 2, wherein the noise power measurer further comprises an averaging device for calculating an average value of the noise power from the power measurer, said average value being taken over a symbol unit, and for generating the calculated average noise power as a noise power measurement signal.

11. A noise power measuring apparatus of a receiver for despreading a signal received over at least one of a plurality of channels and estimating noise power from the despread received signal, in a CDMA mobile communication system having the receiver and a transmitter, the apparatus comprising:

an orthogonal code generator for generating one of orthogonal codes which are orthogonal with and different from an orthogonal code used for said at least one channel;

a correlator connected to the orthogonal code generator, for performing correlation operation between the orthogonal code generated by the orthogonal code generator and the despread received signal; and a power measure connected to the correlator, for measuring noise power from an output of the correlator.

12. The noise power measuring apparatus as claimed in claim 11, wherein the orthogonal code generator generates an orthogonal code of '1,1,1,1,-1,-1-1,-1,-1,-1,-1,-1,1,1, 1,1'.

13. The noise power measuring apparatus as claimed in claim 11, further comprising:

an orthogonal code selector for receiving a channel state signal indicating an orthogonal code used for said at least one channel, and selecting one of orthogonal codes which are orthogonal with and different from said orthogonal code of said at least one channel according to the channel state signal.

14. The noise power measuring apparatus as claimed in claim 12, further comprising a synchronization (sync) acquisition device for acquiring synchronization from the received signal and generating a sync acquisition signal for synchronizing the orthogonal code generator with the received signal.

15. The noise power measuring apparatus as claimed in claim 11, further comprising an averaging device for calculating an average value of the noise power from the power measurer, said average value being taken over a symbol unit, and for generating the calculated average noise power as a noise power measurement signal.

16. A method for measuring a signal-to-noise ratio (SNR) of a signal received at a base station over at least one of a plurality of channels in a mobile station transmitter for a CDMA mobile communication system, each of the plurality of the channels having a corresponding orthogonal code, the method comprising the steps of:

despreading the received signal with a complex despreading sequence;

measuring noise power from the despread received signal by removing signal power by using a noise power measurement orthogonal code which is orthogonal with at least one of the orthogonal codes of the plurality of the channels;

measuring signal power from the despread received signal; and measuring an SNR based on the noise power and the signal power.

17. The method as claimed in claim 16, wherein the noise power measuring step comprises the steps of:

generating the noise power measurement orthogonal code;

performing correlation operation between the noise power measurement orthogonal code and the despread received signal; and measuring the noise power from an output of the correlation operation.

18. The method as claimed in claim 16, wherein the noise power measurement orthogonal code is '1,1,1,1,-1,-1,-1,-1,-1,-1,-1,-1,1,1,1,1'.

19. The method as claimed in claim 16, wherein the noise power measurement orthogonal code is '1,1,-1,-1'.

20. The method as claimed in claim 16, wherein the noise power measurement orthogonal code is '1,-1 '.

21. The method as claimed in claim 16, wherein the signal power is removed by multiplying the despread received signal with the noise power measurement orthogonal code.

22. The method as claimed in claim 17, wherein the orthogonal code generation step comprises the steps of:

receiving a channel state signal indicating at least one of the corresponding orthogonal codes used for at least one of the plurality of the channels;

selecting an appropriate orthogonal code to be the noise power measurement orthogonal code according to the channel state signal; and generating the selected orthogonal code.

23. The method as claimed in claim 16, further comprising the steps of:

acquiring synchronization from the received signal; and generating a synchronization (sync) acquisition signal for synchronizing the despreading operation with the noise power measuring operation.

24. The method as claimed in claim 16, wherein the noise power measuring step further comprises the steps of:

calculating an average value of the measured noise power in a symbol unit; and generating the calculated average noise power as a noise power measurement signal.

25. A method for measuring noise power of a received signal in a base station for a Code Division Multiple Access (CDMA) mobile communication system, said received signal being transmitted over at least one of a plurality of channels in the mobile communication system and each of the channels having a corresponding orthogonal code, the method comprising the steps of:

despreading the received signal with a complex despreading sequence;

generating a noise power measurement orthogonal code, said noise power measurement orthogonal signal being orthogonal to at least one of the orthogonal codes of the channels;

performing correlation operation between the generated noise power measurement orthogonal code and the despread received signal; and measuring noise power from a resulting value of the correlation operation.

26. The method as claimed in claim 25, wherein the generated noise power measurement orthogonal code is '1,1,1,1,-1,-1-1,-1,-1,-1,-1,-1,1,1,1,1'.

27. The method as claimed in claim 25, wherein the noise power measurement orthogonal code generation step comprises the steps of:

receiving a channel state signal indicating at least one of the corresponding orthogonal codes used for said at least one of the channels;

selecting the noise power measurement orthogonal code from at least one orthogonal code which is orthogonal to the at least one of the orthogonal codes indicated in the channel state signal; and generating the selected orthogonal code.

28. The method as claimed in claim 25, further comprising the steps of:

acquiring synchronization from the received signal; and generating a synchronization (sync) acquisition signal for synchronizing the noise power measurement orthogonal code with the received signal.

29. The method as claimed in claim 25, further comprising the steps of:

calculating an average value of the noise power, said average being taken over a symbol unit; and generating the calculated average noise power as a noise power measurement signal.

* * * * *